United States Patent
Larin

(10) Patent No.: US 9,043,582 B2
(45) Date of Patent: May 26, 2015

(54) ENHANCED INSTRUCTION SCHEDULING DURING COMPILATION OF HIGH LEVEL SOURCE CODE FOR IMPROVED EXECUTABLE CODE

(75) Inventor: Sergei Larin, Austin, TX (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 61 days.

(21) Appl. No.: 13/619,709

(22) Filed: Sep. 14, 2012

(65) Prior Publication Data

US 2014/0082330 A1    Mar. 20, 2014

(51) Int. Cl.
*G06F 9/30* (2006.01)
*G06F 9/45* (2006.01)

(52) U.S. Cl.
CPC ............ *G06F 9/30043* (2013.01); *G06F 8/445* (2013.01); *G06F 8/433* (2013.01)

(58) Field of Classification Search
USPC ........................................................ 717/161
See application file for complete search history.

(56) References Cited

U.S. PATENT DOCUMENTS

| 8,510,751 | B2 * | 8/2013 | Saha et al. ................... 719/313 |
| 8,578,389 | B1 * | 11/2013 | Boucher ....................... 718/106 |
| 8,584,106 | B2 * | 11/2013 | Papakipos et al. ............ 717/140 |
| 2005/0216899 | A1 * | 9/2005 | Muthukumar et al. ....... 717/151 |
| 2009/0013316 | A1 * | 1/2009 | Martin .......................... 717/161 |

OTHER PUBLICATIONS

Hagras et al., Static vs. Dynamic List-scheduling Peformance Comparison, Jun. 2003, ACTA Polytechnica, vol. 43, No. 6/2003.*
Hagras et al., Static vs. Dynamic List-Scheduling Performance Comparison, Jun. 2003, ACTA Polytechnica, vol. 43, No. 6/2003.*

* cited by examiner

*Primary Examiner* — Don Wong
*Assistant Examiner* — Reshaun M Finkley
(74) *Attorney, Agent, or Firm* — Neugeboren O'Dowd PC

(57) ABSTRACT

Systems and methods for static code scheduling are disclosed. A method can include receiving an intermediate representation of source code, building a directed acyclic graph (DAG) for the intermediate representation, and creating chains of dependent instructions from the DAG for cluster formation. The chains are merged into clusters and each node in the DAG is marked with an identifier of a cluster it is part of to generate a marked instruction DAG. Instruction DAG scheduling is then performed using information about the clusters to generate an ordered intermediate representation of the source code.

20 Claims, 6 Drawing Sheets

ENHANCED INSTRUCTION SCHEDULING DURING COMPILATION OF HIGH LEVEL SOURCE CODE FOR IMPROVED EXECUTABLE CODE

BACKGROUND

1. Field

The present invention relates generally to compilers that compile high-level code to machine code and more specifically to the scheduling of instructions during compilation.

2. Background

In general, when a high-level language such as C or C++ is compiled to executable machine code a translation occurs from a human readable source code language (e.g., C or C++) into a processor executable machine language, which includes a set of machine instructions that are executable by a processor.

There are two widely used types of processor architectures: superscalar and very long instruction word (VLIW) architectures. The superscalar approach utilizes complex hardware that dynamically schedules around instruction dependencies at runtime to avoid certain hazards (e.g., x86, power PC, and ARM hardware). In the VLIW approach, much simpler hardware is utilized, which is generally incapable of dynamic conflict resolution. For this reason all instruction scheduling is done statically, during compile time. This allows for simpler hardware, but puts more of a burden on the compiler because the sequence of instructions that are produced by the compiler is the sequence that will be executed by the hardware. As a consequence, there is more of an emphasis on compile techniques in the VLIW approach.

Many manufacturers are opting for simpler hardware and shifting the complexity to compile time, but existing compilers are often either geared toward compiling for superscalar hardware or are otherwise unsatisfactory with respect to scheduling instructions for efficient execution. As a consequence, it would be desirable to improve compiler implementation to produce a more optimal sequence of instructions at compile time.

SUMMARY

Aspects of the invention may include a method for static code scheduling. The method may include receiving an intermediate representation of source code, building a directed acyclic graph (DAG) for the intermediate representation, and creating chains of dependent instructions from the DAG for cluster formation. The chains are then merged into clusters and each node in the DAG is then marked with an identifier of the cluster that it is part of to generate a marked instruction DAG. Instruction DAG scheduling is then performed using information about the clusters to generate an ordered intermediate representation of the source code.

Other aspects may be characterized as an instruction scheduling component that includes an instruction DAG formation component that receives an intermediate representation of source code and builds a directed acyclic graph (DAG) for the intermediate representation. A static instruction DAG analysis component creates chains of dependent instructions from the DAG for cluster formation and merges the chains into clusters before marking each node in the DAG with an identifier of a cluster that each node is part of to generate a marked instruction DAG. An instruction DAG scheduling component then performs instruction DAG scheduling using information about the clusters to generate an ordered intermediate representation of the source code.

DETAILED DESCRIPTION

Figure 1:
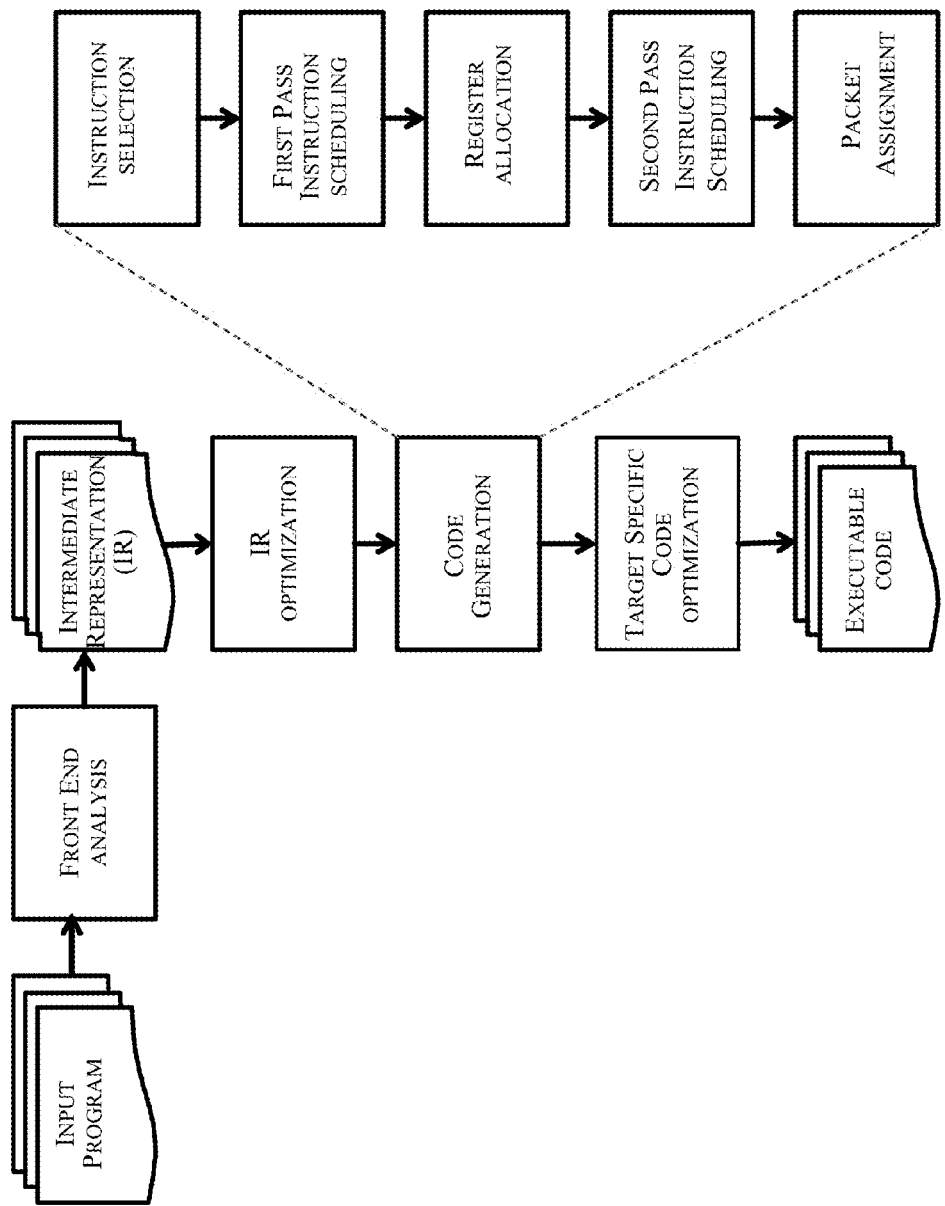
FIG. 1 is a block diagram depicting a typical, prior art process for compiling high level source code into executable code.

Referring first to FIG. 1, it is a block diagram depicting the structure of a typical compiler. As shown, a front end analysis module receives a source code input program (e.g., in C or C++) and generates an intermediate representation (IR) of the source code. As shown, an IR optimization module receives the IR representation and generates a more optimized version of the IR code that is received by a typical code generation module. A more detailed view of the typical code generation module is shown in FIG. 1 because embodiments described herein include inventive aspects that improve upon the typical code generation.

As depicted, the code generation in a typical compiler includes instruction selection, and before register allocation occurs, first pass instruction scheduling is carried out, which deals with nontrivial analysis of instruction dependencies. Up until register selection occurs, virtual registers are utilized for temporary storage, and there may be unlimited number of virtual registers. But existing processors include a limited number of physical registers (e.g., 32 or 64), and as a consequence, the potentially unlimited number of virtual registers needs to be mapped to the limited number of physical registers, which changes the overall number of instructions, adds memory access, and the code becomes much more interdependent. In this typical code generation module, the first pass scheduling module is prone to carry out aggressive instruction scheduling that can unjustifiably increase the number and length of live range of certain values, which results in excessive register pressure after register allocation. As a consequence of this over-aggressive scheduling, the resultant executable code executes slower, is larger in size, and requires more run time memory (e.g., has larger memory footprint).

After register allocation, there is a second pass of scheduling that deals more with physical dependencies and the limitations imposed by hardware resources. And after the second pass scheduling, in VLIW architectures, there is a packet assignment step that forms packets (also referred to as bundles), which are instructions that will be issued in the same cycle to the VLIW core for execution. Up until the packet assignment step, there is a serial stream of instructions, but during the packet assignment step instruction level parallelism (ILP) is actualized by issuing multiple instructions during the same cycle, which is also generally considered a scheduling step. As shown, once packet assignment is complete, code generation is complete from a scheduling perspective and target specific code optimization is then carried out to generate the executable code.

Figure 2:
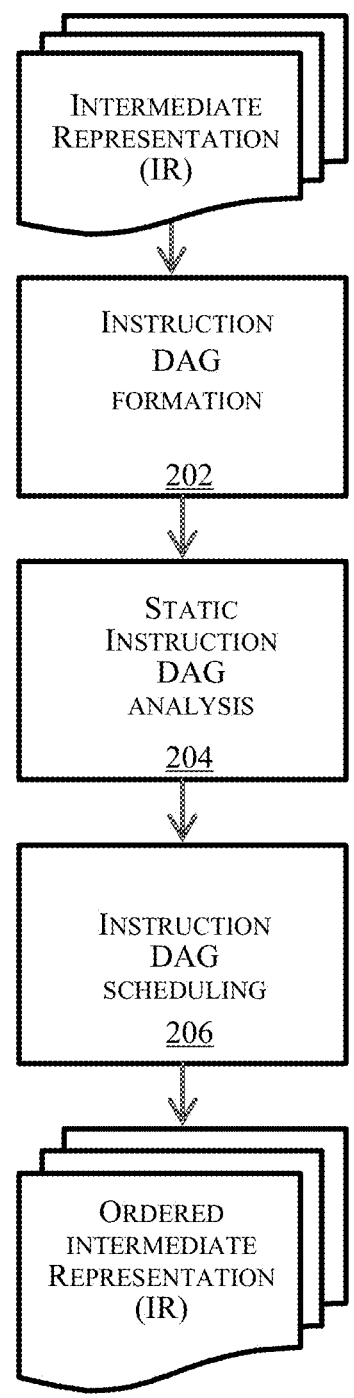
FIG. 2 is a block diagram depicting inventive modifications of the first and second pass instruction scheduling modules depicted in FIG. 1.

Referring next to FIG. 2, it is a block diagram depicting additional inventive modifications to the first and second pass instruction-scheduling modules depicted in FIG. 1. As shown, in this embodiment the first and second pass instruction-scheduling components include an instruction directed acyclic graph (DAG) formation component 202, a static instruction DAG analysis component 204, and an instruction DAG scheduling component 206. As depicted, the first and second pass instruction-scheduling components generally operate to generate an ordered IR representation of source code from an intermediate representation of the source code that is generated by the IR optimization module. As discussed further herein, however, the ordered IR representation of source code produced by the embodiment depicted in FIG. 2 leads to several improvements to the executable code including improved scheduling (that results in shorter runtime), smaller code size, and lower runtime memory requirements.

The depicted instruction DAG formation component 202 in this embodiment generally operates as other, typical instruction DAGs to build a DAG based upon the received IR representation of source code. As one of ordinary skill in the art will appreciate, the nodes in the DAG represent instructions to be scheduled, and the edges in the DAG represent dependencies between the instructions. Each instruction of a node (also referred to as a scheduling unit) may include real machine instructions, groups of instructions, and/or pseudo instructions.

The static instruction DAG analysis component 204 is a new component not found in typical compilers that generally functions to create, using the DAG, chains of instructions (also referred to as ordered groups of instructions) that are each a collection of instructions related by certain data flow dependency. These chains may then be further merged into ordered instruction clusters. As discussed further herein with reference to FIG. 3, the creation of instruction chains effectively allows balancing between explicit ILP extraction and live range complexity growth, which ultimately results in a near optimal instruction ordering.

The instruction DAG scheduling component 206 then performs instruction DAG scheduling using information about the clusters (or chains if the chains are not merged together) to generate the ordered intermediate representation. As discussed further herein with reference to FIG. 4, the instruction DAG scheduling component 206 may perform a dynamic estimation of register pressure within the scheduled region during scheduling, and the instruction DAG scheduling component 206 may employ similar cluster formation techniques as the static instruction DAG analysis component 204 when modeled register pressure exceeds a limit. In addition, scheduling may be adjusted by the instruction DAG scheduling component 206 to prioritize completion of members of a started cluster over members of any other cluster to reduce the number of live value ranges and reduce anticipated register pressure.

Unlike the typical prior art schedulers that employ dynamic register pressure modeling methodologies, the static instruction DAG analysis component 204 performs, in advance of scheduling, static estimation of live range growth to proactively address live range growth in advance—as opposed to dynamically reacting to it once the problem has already been created. Although the instruction DAG scheduling component 206 also utilizes dynamic methodologies to react to growing register pressure during scheduling, it does so on a more targeted and efficient manner than typical prior art schedulers.

Figure 3:
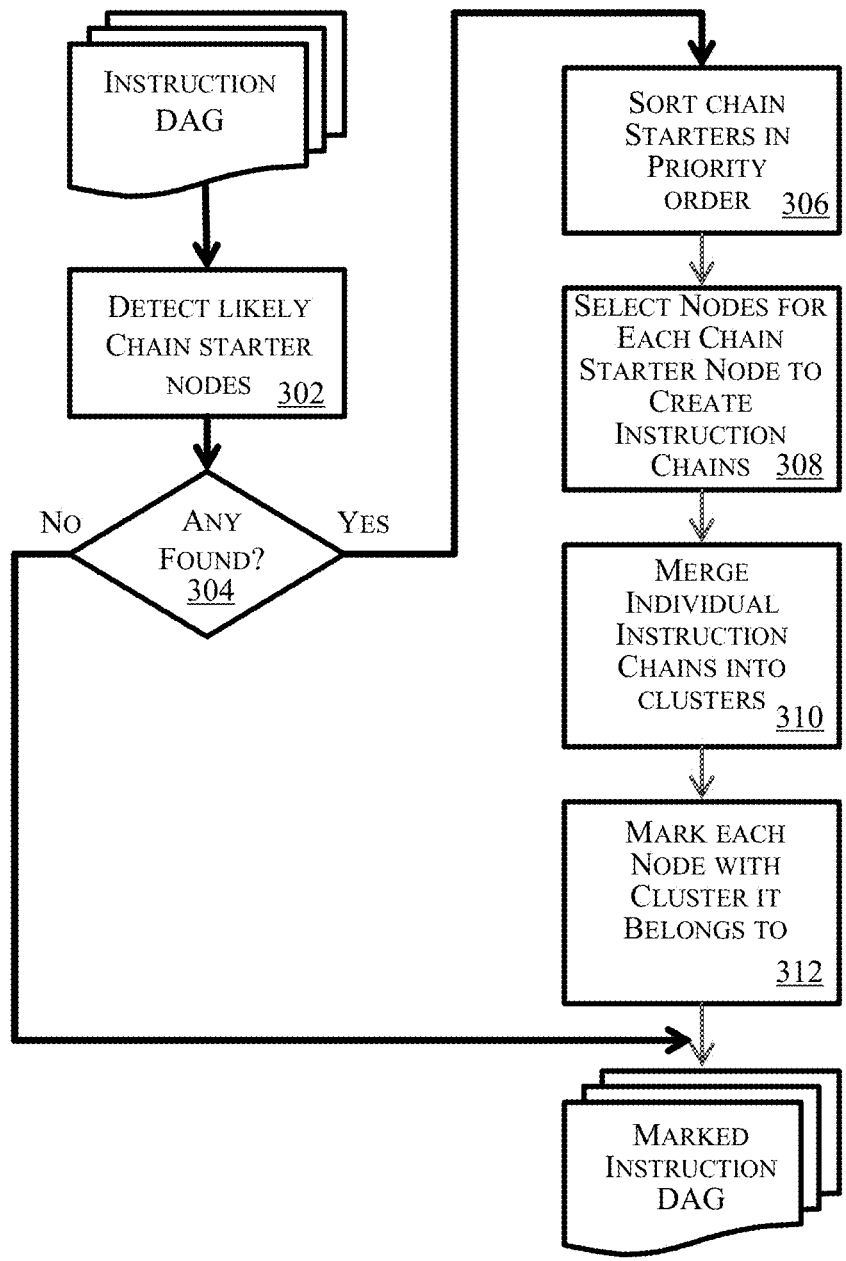
FIG. 3 is a flow chart depicting a method for static instruction DAG analysis that may be performed by the static instruction DAG analysis component depicted in FIG. 2.

Referring next to FIG. 3, it is a flow chart depicting a method for static instruction DAG analysis that may be performed by the static instruction DAG analysis component 204 depicted in FIG. 2. As shown, the instruction DAG from the instruction DAG formation component 202 is analyzed to detect likely chain starter nodes (Block 302). More specifically, likely chain starter nodes (also referred to herein as chain tops) are detected for sequences of dependent instructions. In some implementations, an instruction is determined to be a chain starter node if it is an actual machine instruction (as opposed to a pseudo or service instruction), the instruction has no predecessors in the DAG, and the instruction has a non-empty successor list that includes at least one machine instruction.

As shown in FIG. 3, if any chain starter nodes are found (Block 304), the chain starters are sorted in a priority order (Block 306). The sorting may be carried out in accordance with sorting heuristics to sort the chain starters in an order that promotes further cluster formation. In one exemplary embodiment, instructions with the largest height are moved to the beginning of the sorting list to be processed first, and instructions with the lowest height are moved to the end of the list to be processed last. As used in this context, the height is the shortest distance from a current instruction to an exit instruction, and distance is measured by the number of nodes between the current node and the exit node.

Once the chain starter nodes are sorted (Block 306), for each chain starter node, nodes are selected from the DAG to add to the chain so that the nodes within an instruction chain are related by certain data flow dependency (Block 308). In many implementations, the selection of nodes to add to each chain is an iterative process to arrive at a collection of instructions that are grouped in a manner, based upon general data dependency, which is more closely aligned with the original logical intent of the programmer of the source code. As a consequence, the creation of chains of data-flow dependent instructions, in connection with the other methodologies described herein, results in better compiled code (e.g., executable code that executes faster, is smaller, and results in less register pressure).

The process for selecting nodes for a chain may be an iterative process that includes analyzing the dependent nodes from each of the chain starter nodes, and based upon a set of heuristics, particular dependent nodes are added to the current chain. More specifically, before creating a chain, a prospective chain starter node is checked to make sure it is not yet part of another chain and to make sure it is not the exit node. If the prospective chain starter node is not part of another chain and is not an exit node, then a list of all non-control-dependent successors of the current node is collected to create a list of data-dependent nodes. The control-dependent nodes are not added to chains because they are not dependent via data flow or register usage, and instead, control-dependent nodes could potentially have memory dependency. As a consequence, control-dependent successor nodes should not generally be reordered. The resultant list of non-control-dependent successors is then sorted in order of descending weight of edges connecting those nodes. As used herein, the weight of an edge is determined by height of the node it is connected to.

Then for each successor of the currently considered node, a recursive check is performed. More specifically, if the successor node belongs to another chain, is the exit node, or represents a control flow altering instruction (e.g., a jump instruction), then iteration is stopped; otherwise, the node is added to the chain. In addition, a list of all non-control-dependent successors of the current node is collected and sorted in order of descendent weight of edges connecting those nodes to generate a sorted dependent list, and then all successors of the current node in the sorted dependent list are checked as discussed in this paragraph.

Once successor nodes have been checked, all the predecessors of the current node are checked. More specifically, for the current node, if the predecessor node belongs to another chain or is already scheduled, then the iterating is stopped. If the predecessor node does not dominate the current chain, then the iterating is stopped. In this context, to dominate means that all successors of the node belong to the current chain. If the node does not belong to another chain, is not already scheduled, and dominates the current chain, then the node is added to the current chain. This check is performed for each predecessor node to determine whether to add predecessor nodes to the current chain.

As shown, once chains are created, the chains may be merged into clusters (Block 310). In some embodiments, if one chain totally dominates another chain, the two chains are merged into a single cluster by sequential concatenation. More specifically, ignoring control dependencies, for each and every node of a first chain, a determination is made whether all of the predecessor nodes of the first chain belong to a second chain, and if so, the first and second chains may be merged into a single cluster. In many instances, chains are not merged with other chains, but each chain still represents a collection of data-flow related nodes that enables improved scheduling. After chains are merged into clusters (Block 310), each of the nodes is marked to indicate the cluster it belongs to in order to generate a marked instruction DAG (Block 312). Although the merging of chains into clusters (Block 310) provides further performance enhancement when chains can be merged, even without the merging of chains, each of the resultant chains (and each of any clusters) is a logically independent group of data-flow dependent instructions (i.e., each chain or cluster is logically independent from other chains or clusters).

Figure 4:
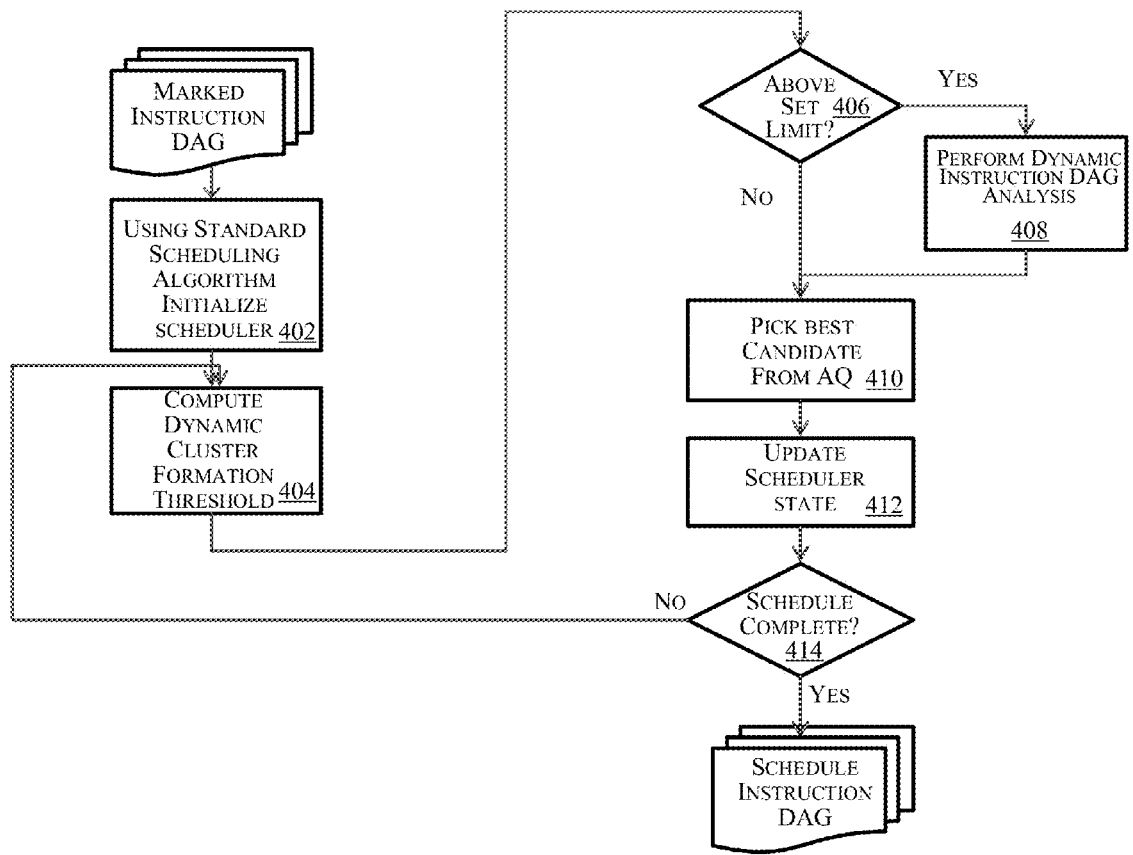
FIG. 4 is a flowchart depicting exemplary steps that may be traversed by the instruction DAG scheduling component described with reference to FIG. 2.

Referring next to FIG. 4, it is a flowchart depicting exemplary steps that may be traversed by the instruction DAG scheduling component 206 described with reference to FIG. 2. As shown, the marked instruction DAG is utilized to initialize a scheduler state, which may be carried out using a standard scheduling algorithm (Block 402), and a dynamic cluster formation measure is calculated (Block 404).

As shown, if the dynamic cluster formation measure is above a set limit (Block 406), a dynamic instruction DAG analysis is carried out to regenerate clusters during instruction DAG scheduling to reduce register pressure (Block 408). The dynamic cluster formation threshold may be a measure of the number of anticipated parallel live ranges, and the regeneration of clusters may include creating clusters from the unscheduled, residual nodes in the DAG.

As depicted, the best candidate is picked from the available queue that contains a list of instructions that could be scheduled in the current machine cycle (Block 410). In general, selecting the best candidates from the available queue at each cycle results in the best schedule, but optimal selection for the entire region is generally an NP-complete problem that is impossible to be performed in reasonable time in practice. In addition to utilizing known heuristics for selecting a best candidate, many embodiments also utilize an additional novel heuristic to balance instruction selection and reduce the number of concurrent live ranges, which directly correlates to register pressure during register allocation.

The typical heuristics that are utilized to select a best candidate include a distance to the end of the DAG (the critical path); hardware resource availability for the current cycle; the number of blocked instructions; and a delta in register pressure modeling that results from the scheduling candidate instruction.

In addition to these typical heuristics, Applicant has found that selecting a candidate for scheduling by prioritizing completion of members of a started cluster over members of any other cluster results in a reduction in the number of live value ranges, and hence, reduces register pressure.

As depicted, once a candidate is selected from the available queue (Block 410), the scheduler state is updated (Block 412), and if scheduling is complete (Block 414), the scheduled instruction DAG is complete and is ready for register allocation.

Figure 5:
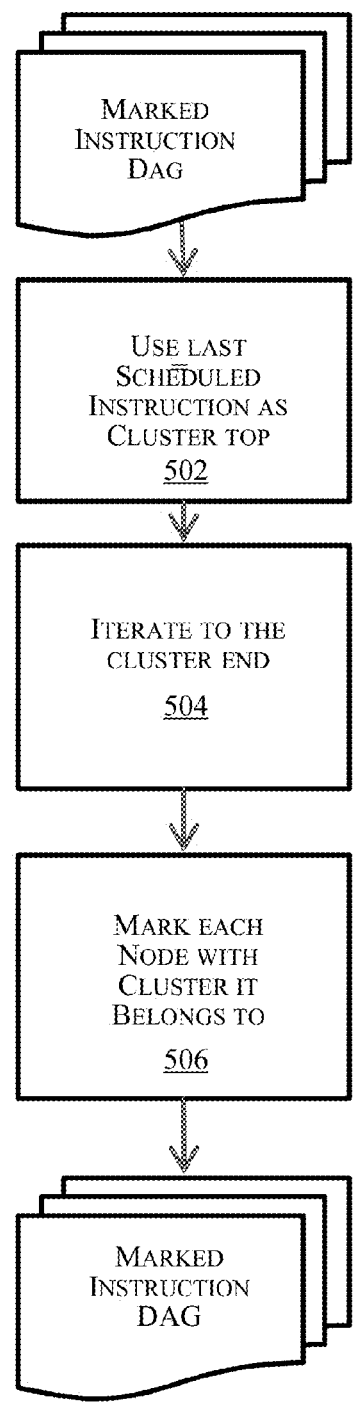
FIG. 5 is a flowchart depicting an exemplary method for effectuating the dynamic instruction DAG analysis depicted in FIG. 4.

Referring next to FIG. 5, it is a flowchart depicting an exemplary method for effectuating the dynamic instruction DAG analysis (Block 408) depicted in FIG. 4. As shown, the marked instruction DAG is received and the prior cluster assignment is discarded, and in one embodiment the last scheduled instruction is used as a cluster top (Block 502). Or in the alternative, all instructions in the available queue could be considered as chain starters.

As shown, for each starter node, each of its dependent nodes is iteratively visited and selectively assembled as part of a cluster (Block 504). In some implementations, nodes are added to a cluster based upon a set of heuristics that includes starting with the last scheduled instruction, making sure that this last scheduled node is not yet part of any other cluster and making sure it is not the exit node. Then a list of all non-control-dependent successors of the current node is collected, and then sorted in order of descendent weight of edges connecting those nodes. Then each and every successor of the current node in the sorted list is iteratively checked.

More specifically, if a successor node belongs to another cluster, is an exit node, or is already scheduled, then the iteration is stopped. And if the successor node represents a control flow altering instruction (e.g., a jump instruction), then the iteration is stopped; otherwise the node is added to the cluster. A list of all non-control-dependent successors of the current node is then collected and sorted to create a sorted list of non-control-dependent successors that are sorted in order of descending weight of edges connecting those nodes (where the weight of an edge is determined by the height of the node it is connected to). Each successor of the current node is recursively iterated as detailed in this paragraph to add nodes to clusters to reorganize the clusters.

As shown in FIG. 5, after dependent nodes are iteratively visited and selected as part of a cluster (Block 504), each node is marked with an indicator of the cluster it belongs to (Block 506) before the best candidate is selected from the available queue (Block 410).

Figure 6:
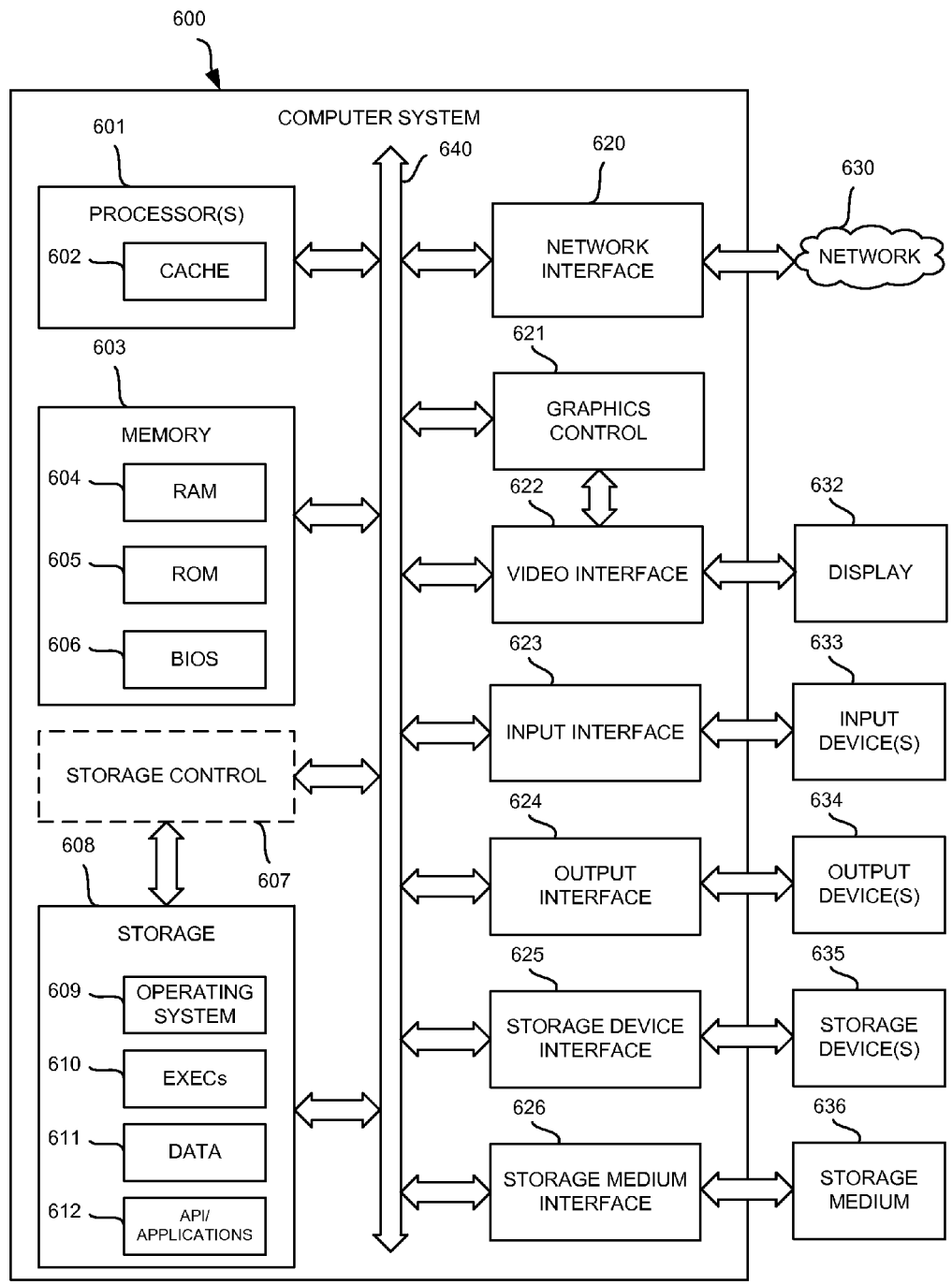
FIG. 6, it is a block diagram depicting an exemplary machine that may be utilized in connection with realizing embodiments described with reference to FIGS. 2-5.

Referring next to FIG. 6, it is a block diagram depicting an exemplary machine that includes a computer system 600 within which a set of instructions can execute for causing a device to perform or execute any one or more of the aspects and/or methodologies for static code scheduling of the present disclosure. The components in FIG. 6 are examples only and do not limit the scope of use or functionality of any hardware, software, embedded logic component, or a combination of two or more such components implementing particular embodiments.

Computer system 600 may include a processor 601, a memory 603, and a storage 608 that communicate with each other, and with other components, via a bus 640. The bus 640 may also link a display 632, one or more input devices 633

(which may, for example, include a keypad, a keyboard, a mouse, a stylus, etc.), one or more output devices 634, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, or computer addresses. Processor(s) 601 are configured to assist in execution of computer readable instructions. Computer system 600 may provide functionality for the static instruction DAG analysis component 204 and the instruction DAG scheduling component 206 as a result of the processor(s) 601 executing non-transitory, processor-executable instructions embodied in one or more tangible computer-readable storage media, such as memory 603, storage 608, storage devices 635, and/or storage medium 636. The computer-readable media may store software that implements particular embodiments, and processor(s) 601 may execute the software. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., a static RAM "SRAM", a dynamic RAM "DRAM, etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, EXECs 610 (executables), data 611, API applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, computer system 600 may include one or more other peripheral output devices 634 including, but not limited to, an audio speaker, a printer, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for multistage acyclic static code scheduling of functional languages for very long instruction word architectures including:
   receiving an intermediate representation of source code representing a function;
   building a region of an instruction directed acyclic graph representing control flow, data dependency, and scheduling hazards in the function;
   selecting a portion of the region of the instruction directed acyclic graph that is prone to aggressive instruction scheduling to be partitioned into a plurality of clusters;
   creating ordered acyclic chains of dependent machine instructions from the portion of the region of the instruction directed acyclic graph for cluster formation wherein creating ordered chains of dependent instructions includes:
   detecting acyclic chain starter nodes in the directed acyclic graph;
   sorting the acyclic chain starter nodes in a priority order based upon a topology of the directed acyclic graph; and
   adding directed acyclic graph nodes to each acyclic chain starter node so directed acyclic graph nodes within each acyclic chain are related by non-control-flow dependency, each added directed acyclic graph node in a particular acyclic chain is dominated by the chain starter node of the particular acyclic chain, and each acyclic chain is independent from other acyclic chains;
   merging by sequential concatenation of selected ones of the ordered acyclic chains of dependent machine instructions to form the plurality of clusters and marking each node in a cluster with an identifier of the cluster it is part of to generate a marked machine instruction directed acyclic graph, wherein the ordered acyclic chains of dependent machine instructions are selected for merging when all nodes in one chain dominate another chain; and performing static list scheduling on the marked machine instruction directed acyclic graph using information about the plurality of clusters to generate an ordered intermediate representation of the source code.

2. The method of claim 1, wherein detecting chain starter nodes includes:

identifying nodes that include an instruction that is a machine instruction, have no predecessor nodes in the directed acyclic graph, and have a non-empty successor list that includes at least one machine instruction.

3. The method of claim 1, including:

regenerating clusters during the static list directed acyclic graph scheduling when anticipated register pressure exceeds a threshold.

4. The method of claim 3, wherein regenerating includes forming clusters of instructions on a portion of the directed acyclic graph that has not yet been scheduled.

5. The method of claim 1, wherein performing instruction directed acyclic graph scheduling includes:

generating an available list of instructions that are available for scheduling in a current machine cycle; and selecting, from the available list, a candidate for scheduling during the current machine cycle based upon whether a current candidate is part of a started cluster to prioritize completion of members of a started cluster over members of any other cluster to reduce the number of live value ranges and reduce anticipated register pressure.

6. An instruction scheduling component for multistage acyclic static code scheduling of functional languages for very long instruction word architectures comprising:

an instruction directed acyclic graph formation component that receives an intermediate representation of source code representing a function and builds a region of an instruction directed acyclic graph representing control flow, data dependency, and scheduling hazards in the function;

a static instruction directed acyclic graph analysis component that selects a portion of the region of the instruction directed acyclic graph that is prone to aggressive instruction scheduling to be partitioned into a plurality of clusters, creates acyclic chains of non-control-flow dependent machine instructions from the portion of the region of the instruction directed acyclic graph for cluster formation, and merges by sequential concatenation of the acyclic chains to form the plurality of clusters before marking each node in the selected portion of the region of the instruction directed acyclic graph with an identifier of a cluster each node is part of to generate a marked instruction directed acyclic graph, wherein the static instruction directed acyclic graph analysis component detects acyclic chain starter nodes in the directed acyclic graph, sorts the acyclic chain starter nodes in a priority order based upon a topology of the directed acyclic graph, and adds nodes to each acyclic chain starter node so directed acyclic graph nodes within each chain are related by non-control-flow dependency, each added directed acyclic graph node in a particular acyclic chain is dominated by the chain starter node of the particular acyclic chain, and each acyclic chain is independent from other acyclic chains, wherein the ordered acyclic chains of dependent machine instructions are selected for merging when all nodes in one chain dominate another chain; and an instruction directed acyclic graph DAG scheduling component that performs static list scheduling on the marked instruction directed acyclic graph DAG using information about the plurality of clusters to generate an ordered intermediate representation of the source code.

7. The instruction scheduling component of claim 6, wherein the static instruction directed acyclic graph analysis component detects starter nodes by identifying nodes that include an instruction that is a machine instruction, have no predecessor nodes in the directed acyclic graph, and have a non-empty successor list that includes at least one machine instruction.

8. The instruction scheduling component of claim 6, wherein the instruction directed acyclic graph scheduling component regenerates clusters during the static list directed acyclic graph scheduling when anticipated register pressure exceeds a threshold.

9. The instruction scheduling component of claim 8, wherein the instruction directed acyclic graph scheduling component regenerates clusters during the instruction directed acyclic graph scheduling by forming clusters of instructions on a portion of the directed acyclic graph that has not been scheduled.

10. The instruction scheduling component of claim 6, wherein the instruction directed acyclic graph scheduling component generates an available list of instructions that are available for scheduling in a current machine cycle and selects, from the available list, a candidate for scheduling during the current machine cycle based upon whether a current candidate is part of a started cluster to prioritize completion of members of a started cluster over members of any other cluster to reduce the number of live value ranges and reduce anticipated register pressure.

11. A non-transitory, tangible computer readable storage medium, encoded with processor readable instructions to perform a method for multistage acyclic static code scheduling of functional languages for very long instruction word architectures including:

selecting a portion of the region of the instruction directed acyclic graph that is prone to aggressive instruction scheduling to be partitioned into a plurality of clusters;

creating ordered acyclic chains of dependent machine instructions from the portion of the region of the instruction directed acyclic graph for cluster formation wherein creating ordered chains of dependent instructions includes:

detecting acyclic chain starter nodes in the directed acyclic graph;

sorting the acyclic chain starter nodes in a priority order based upon a topology of the directed acyclic graph; and adding directed acyclic graph nodes to each acyclic chain starter node so directed acyclic graph nodes within each acyclic chain are related by non-control-flow dependency, each added directed acyclic graph node in a particular acyclic chain is dominated by the chain starter node of the particular acyclic chain, and each acyclic chain is independent from other acyclic chains;

merging by sequential concatenation of selected ones of the ordered acyclic chains of dependent machine instructions to form the plurality of clusters and marking each node in a cluster with an identifier of the cluster it is part of to generate a marked machine instruction directed acyclic graph, wherein the ordered acyclic chains of dependent machine instructions are selected for merging when all nodes in one chain dominate another chain; and performing static list scheduling on the marked machine instruction directed acyclic graph using information about the plurality of clusters to generate an ordered intermediate representation of the source code.

12. The non-transitory, tangible computer readable storage medium of claim 11, wherein detecting chain starter nodes includes:

identifying nodes that include an instruction that is a machine instruction, have no predecessor nodes in the directed acyclic graph, and have a non-empty successor list that includes at least one machine instruction.

13. The non-transitory, tangible computer readable storage medium of claim 11, the method including:

regenerating clusters during the static list directed acyclic graph scheduling when anticipated register pressure exceeds a threshold.

14. The non-transitory, tangible computer readable storage medium of claim 13, wherein regenerating includes forming clusters of instructions on a portion of the directed acyclic graph that has not been scheduled.

15. The non-transitory, tangible computer readable storage medium of claim 11, wherein performing instruction directed acyclic graph scheduling includes:

generating an available list of instructions that are available for scheduling in a current machine cycle; and selecting, from the available list, a candidate for scheduling during the current machine cycle based upon whether a current candidate is part of a started cluster to prioritize completion of members of a started cluster over members of any other cluster to reduce the number of live value ranges and reduce anticipated register pressure.

16. A machine for multistage acyclic static code scheduling of functional languages for very long instruction word architectures including:

means for receiving an intermediate representation of source code representing a function;

means for building a region of an instruction directed acyclic graph representing control flow, data dependency, and scheduling hazards in the function;

means for selecting a portion of the region of the instruction directed acyclic graph that is prone to aggressive instruction scheduling to be partitioned into a plurality of clusters;

means for creating ordered acyclic chains of dependent machine instructions from the portion of the region of the instruction directed acyclic graph for cluster formation wherein creating ordered chains of dependent instructions includes:

means for detecting acyclic chain starter nodes in the directed acyclic graph;

means for sorting the acyclic chain starter nodes in a priority order based upon a topology of the directed acyclic graph; and means for adding directed acyclic graph nodes to each acyclic chain starter node so directed acyclic graph nodes within each acyclic chain are related by non-control-flow dependency, each added directed acyclic graph node in a particular acyclic chain is dominated by the chain starter node of the particular acyclic chain, and each acyclic chain is independent from other acyclic chains;

means for merging by sequential concatenation of selected ones of the ordered acyclic chains of dependent machine instructions to form the plurality of clusters and marking each node in a cluster with an identifier of the cluster it is part of to generate a marked machine instruction directed acyclic graph, wherein the ordered acyclic chains of dependent machine instructions are selected for merging when all nodes in one chain dominate another chain; and means for performing static list scheduling on the marked machine instruction directed acyclic graph using information about the plurality of clusters to generate an ordered intermediate representation of the source code.

17. The machine of claim 16, wherein means for detecting chain starter nodes includes:

means for identifying nodes that include an instruction that is a machine instruction, have no predecessor nodes in the directed acyclic graph, and have a non-empty successor list that includes at least one machine instruction.

18. The machine of claim 16, including:

means for regenerating clusters during the static list directed acyclic graph scheduling when anticipated register pressure exceeds a threshold.

19. The machine of claim 18, wherein means for regenerating includes means for forming clusters of instructions on a portion of the directed acyclic graph that has not been scheduled.

20. The machine of claim 16, wherein means for performing instruction directed acyclic graph scheduling includes:

means for generating an available list of instructions that are available for scheduling in a current machine cycle; and means for selecting, from the available list, a candidate for scheduling during the current machine cycle based upon whether a current candidate is part of a started cluster to prioritize completion of members of a started cluster over members of any other cluster to reduce the number of live value ranges and reduce anticipated register pressure.

* * * * *